United States Patent
Chou

(10) Patent No.: US 6,648,302 B1
(45) Date of Patent: Nov. 18, 2003

(54) OPERATING MEMBER OF A LASHING ROPE WINCH

(76) Inventor: An-Chuan Chou, No. 212, Yung-An Street, Tainan (TW)

(*) Notice: Subject to any disclaimer, the term of this patent is extended or adjusted under 35 U.S.C. 154(b) by 0 days.

(21) Appl. No.: 10/166,638

(22) Filed: Jun. 12, 2002

(51) Int. Cl.⁷ .......................... B21F 9/00; B25B 25/00; B66F 3/00
(52) U.S. Cl. .................. 254/218; 24/69 ST; 24/71 ST; 74/545; 74/543
(58) Field of Search .................... 254/217, 218, 254/223, 237; 24/68 R, 69 ST, 69 CT, 71 ST; 74/545, 543, 544, 547, 548

(56) References Cited

U.S. PATENT DOCUMENTS

| | | | | |
|---|---|---|---|---|
| 429,416 A | * | 6/1890 | Brown | 74/551.9 |
| 499,103 A | * | 6/1893 | Goddard | 74/551.9 |
| 675,917 A | * | 6/1901 | Allen | 81/35 |
| 729,418 A | * | 5/1903 | Robertson | 74/551.9 |
| 744,739 A | * | 11/1903 | Fliess | 219/201 |
| 989,203 A | * | 4/1911 | Stebbins | 384/316 |
| 1,280,564 A | * | 10/1918 | Shapiro | 200/505 |
| 2,302,954 A | * | 11/1942 | Priest et al. | 228/173.5 |
| 2,398,436 A | * | 4/1946 | Mason | 220/752 |
| 4,688,571 A | * | 8/1987 | Tesler | 606/234 |
| 5,904,341 A | * | 5/1999 | Norrby | 254/243 |
| 6,185,786 B1 | * | 2/2001 | Garcia | 16/430 |

* cited by examiner

Primary Examiner—Emmanuel M Marcelo
(74) Attorney, Agent, or Firm—Rosenberg, Klein & Lee

(57) ABSTRACT

A winch for a lashing rope includes ratchets, and an operating member, which consists of a handle, and a pair of levers. The handle has connecting rooms at two ends; the levers have bent end portions, which are passed into the connecting rooms, and are fixed in position by means of bolts; thus, the levers can be pivoted to and fro for stretching a rope. The handle is luminous so that the workers can easily find the same in the dark. The handle is provided with a corrugated surface and anti-slip protrusions so that the user can hold the same without possibility of slipping in operating the winch to stretch a rope.

9 Claims, 6 Drawing Sheets

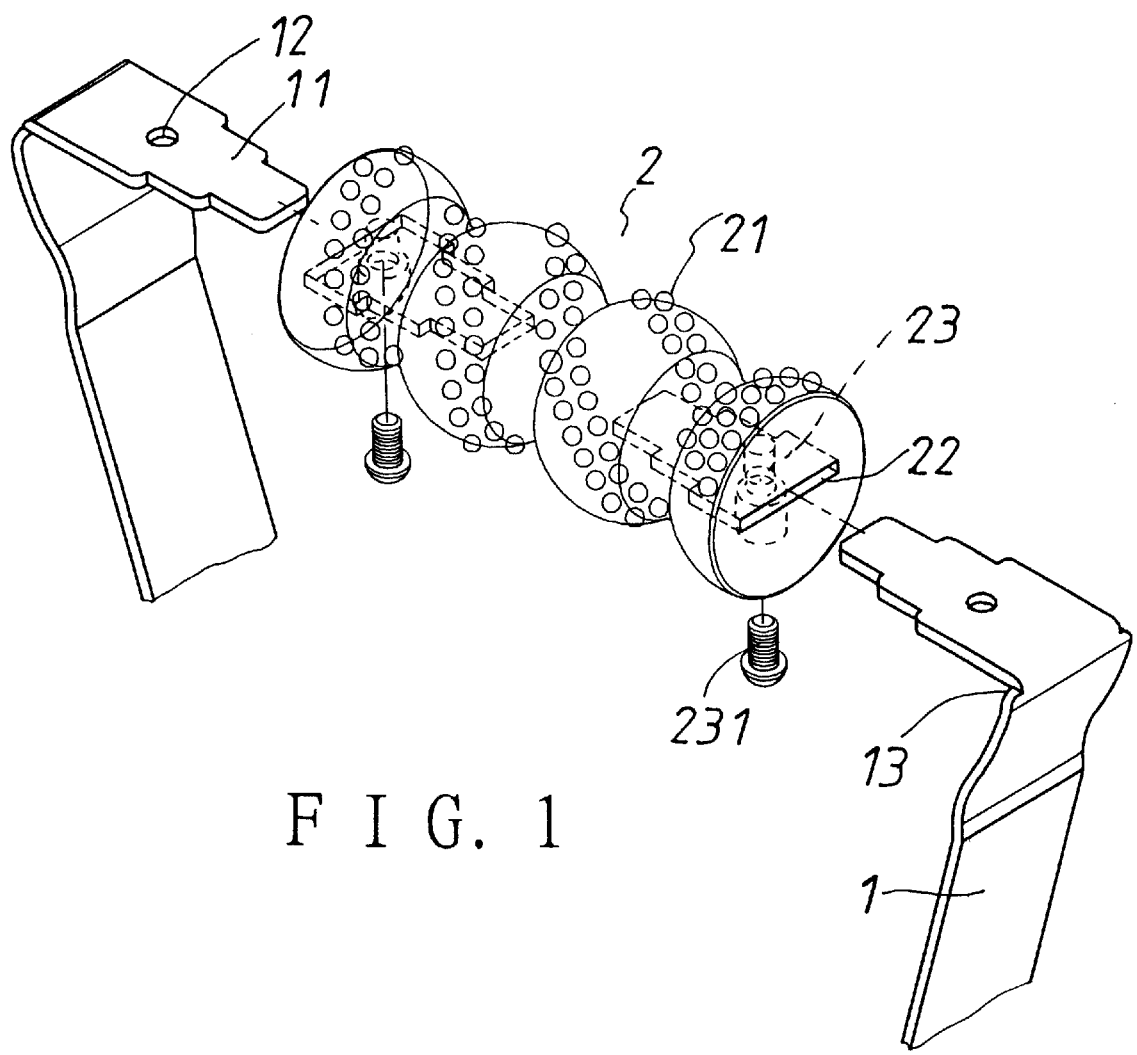
F I G. 1
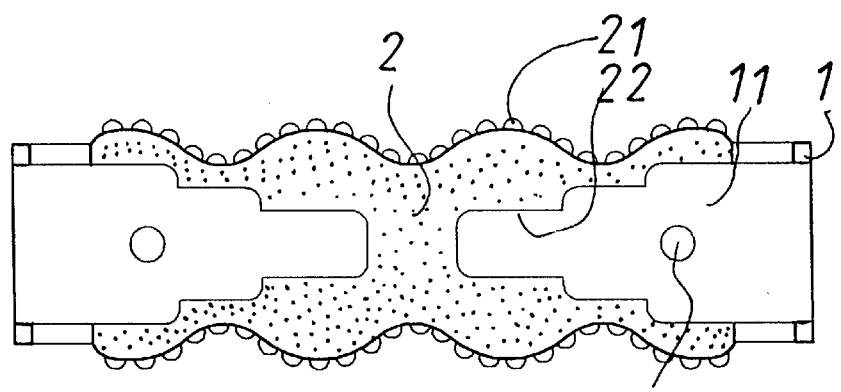
F I G. 3

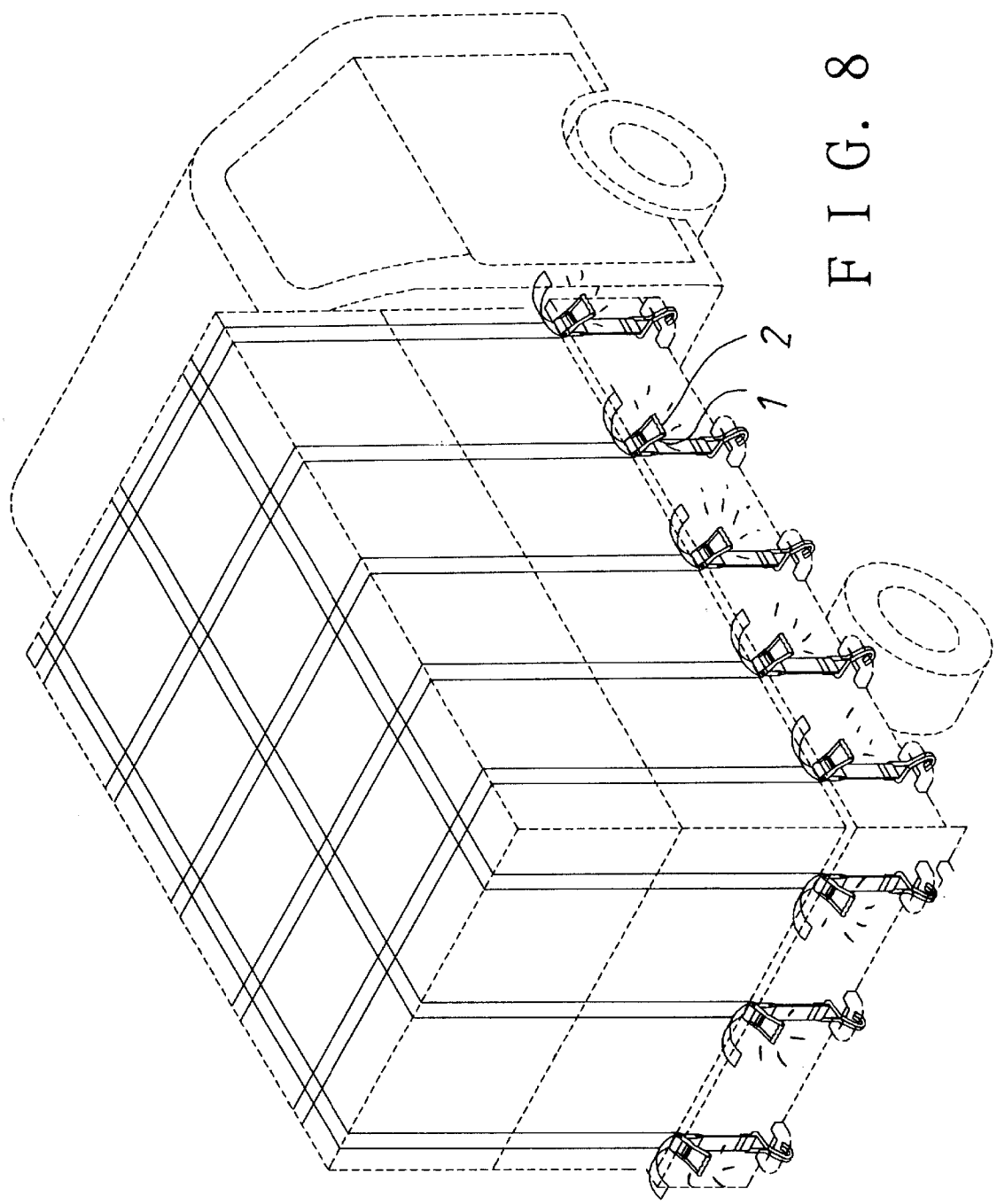

OPERATING MEMBER OF A LASHING ROPE WINCH

BACKGROUND OF THE INVENTION

The present invention relates to a winch of a lashing rope used for fastening cargo onto a truck, more particularly a winch, which can be operated for stretching the lashing rope by means of moving a lever to and fro, and which is provided with such a handle that it can be assembled and operated relatively easily.

Referring to FIG. 9, a conventional winch of a lashing rope used for fastening cargo onto a truck includes a support base 31, a pair of operating levers 32, turning rods 33, an engaging plate 34, ratchets 35, and engaging member 36, and a handle 37.

The support base 31 has two parallel lateral plates (not numbered), a connecting rod 311 connected to outer ends of the lateral plates, and a holding protrusion 313 fixedly disposed between the lateral plates. The lateral plates have opposing pivotal holes at inner ends thereof and slots 312 that are opposite each other.

The turning rod 33 is turnably passed through the pivotal holes of the support base 31. The turning rod 33 has a lengthwise formed elongated gap 331 for allowing a rope to be connected thereto. The ratchet 35 is connected to a respective end of the turning rod 33.

The operating levers 32 are connected to the turning rod 33 at inner ends thereof. The operating levers 32 have slots 321 that are opposite each other. The handle 37 is connected to the outer ends of the operating levers 32.

The engaging member 36 is movably fitted to the operating levers 32, and is biased by an elastic member (not numbered) so that an engaging plate portion 361 thereof engages the teeth of the ratchets 35; two ends of the engaging plate portion 361 stick out through the slots 321 of levers 32. The engaging plate 34 is movably fitted to the support base 31 with two ends thereof sticking out through the slots 312 of the base 31. The engaging plate 34 has a rod portion 342. and an elastic member 343; the elastic member 343 is secured to the holding protrusion 313 of the base 31 at one end, and the rod portion 342 is passed into other end of the elastic member 343 so that the engaging plate 34 is biased towards the ratchets 35 to engage the same at an engaging portion 341 thereof.

In using the winch, a first rope is connected to the truck and the connecting rod 311 at two ends. And, a second rope is connected to the opposite side of the truck and the turning rod 33 at tow ends, and is passed over the cargo on the truck. Thus, the ropes are stretched to fasten the cargo tightly onto the truck by means of moving the handle 37 to and fro to wind the second rope around the turning rod 33. To loosen the ropes, both the engaging member 36 and the engaging plate 34 are moved away from the ratchets 35 to disengage same so that the ratchets 35 and the turning rod 33 can turn in the opposite direction.

Referring to FIG. 10, the handle 37 is provided with connecting ends 371 that have semi-circular shape, while the outer ends of the operating levers 32 are provided with semi-circular holes 322 so that the connecting ends 371 can fit in the holes 322. The connecting ends 371 are passed through the holes 322, and are then struck into a flat shape so that the handle 27 is firmly connected to the levers 32.

The winch of a lashing rope is found to have disadvantages as followings:

1. It costs relatively much labor to strike the connecting ends 371 of the handle 37 into a flat shape for firmly connecting the handle 37 to the levers 32. Consequently, the manufacturing cost is increased.
2. In order for the ends to be able to be struck into flat shape, the handle 37 has to be made of metallic materials. Consequently, the style, design and colors the handle can be presented with are limited to a great degree.

SUMMARY OF THE INVENTION

Therefore, it is a main object of the present invention to provide a handle to the above winch of a lashing rope that can be easily fitted in position, and can be made to have various shapes and colors to be attractive.

It is another object of the present invention to provide luminous substance to the handle so that people can easily find the handle in the dark when the winch is used on a truck.

BRIEF DESCRIPTION OF THE DRAWINGS

The present invention will be better understood by reference to the accompanying drawings, wherein:

FIG. 1 is an exploded perspective view of the operating member of a winch according to the present invention.

FIG. 3 is a cross-sectional view of the operating member of the present invention.

FIG. 8 is a view illustrating the use of the winch for a lashing rope according to the present invention.

DETAILED DESCRIPTION OF THE PREFERRED EMBODIMENTS

Figure 9:
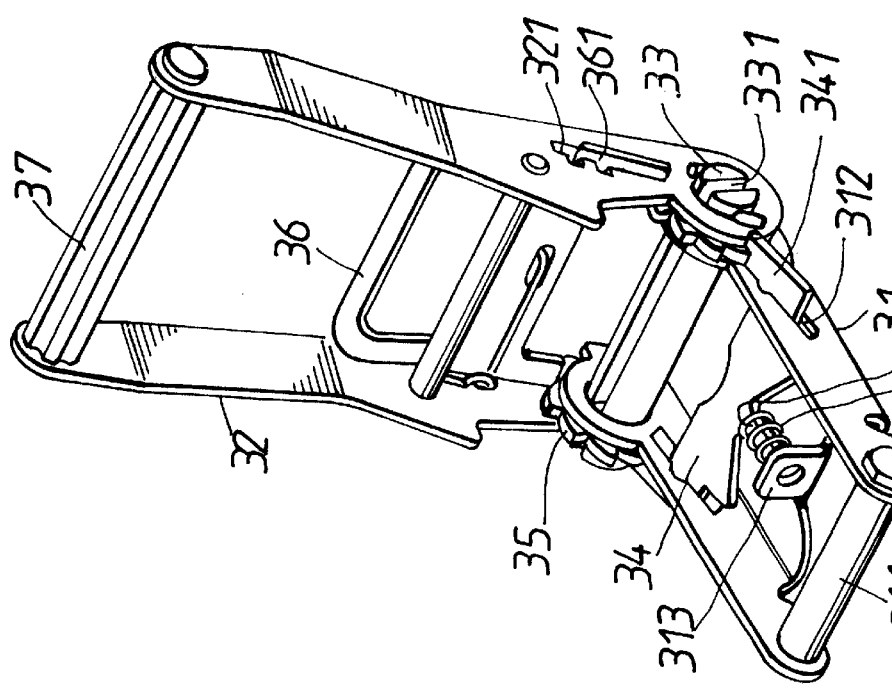
FIG. 9 is a perspective view of the conventional winch in the Background.

Referring to FIG. 1, an operating member is provided to the above lashing rope winch (FIG. 9) instead of the conventional handle 37 and levers 32; the operating member consists of a handle 2, and a pair of operating levers 1.

The handle 2 can be formed with a corrugated surface. and has connecting rooms 22 at two ends. The handle 2 can be made of plastic materials, and provided with any desired shape or color. The handle 2 further has connecting bolt holes 23 communicating with the connecting rooms 22, and several anti-slip protrusions 21 on the surface. The materials of the handle 2 can have luminous substance added therein so that people can easily see the handle 2 in the dark.

The levers 1 have bent extension portions 11 at upper ends thereof, the extension portions 11 have irregular edges, and through holes 12. The levers 1 are made of medium carbon steel, and are heat treated so that the extension portions 11 can't easily deform or break. The handle 2 is connected to the levers 1 with the connecting rooms 22 being fitted onto the extension portions 11; bolts 231 are screwed into the connecting holes 23 and the through holes 12 to secure the connection of the handle 2 with the levers 1. Thus, by means of moving the handle 2, the levers 1 can be pivoted to and fro on the support base 31 of the winch (FIG. 9) for stretching a rope that is connected to the support base 31 at one end, and the turning rod 33 (FIG. 9) at other end.

Figure 4:
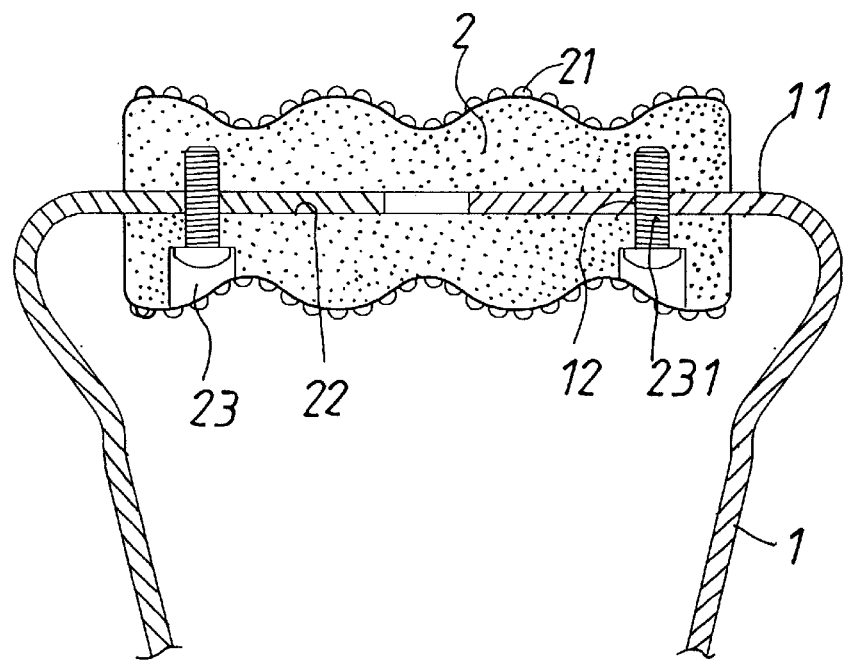
FIG. 4 is a cross-sectional view of the operating member of the second embodiment.

Furthermore, referring to FIG. 4, the levers 1 each has a concavely curved section 13, which is adjacent to the extension portion 11 and faces the handle 2 so that the levers 1 can't touch the hands of a user to hinder the operation. Referring to FIG. 8, the winch is connected to two ropes that are passed over the cargo of the truck, then, the handle 2 is moved to and fro so that turning rod 33 (FIG. 9) is turned together with the levers 1 to stretch the ropes.

Figure 2:
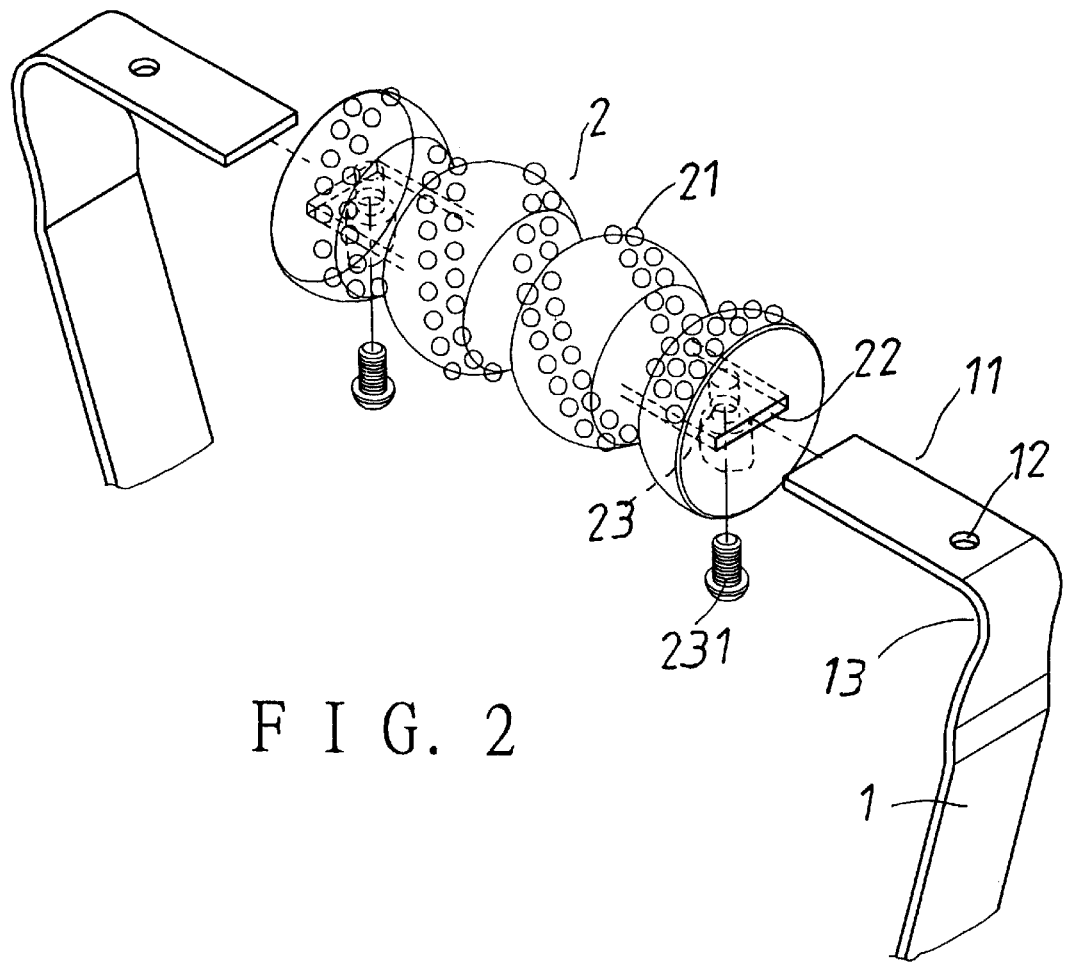
FIG. 2 is an exploded perspective view of the operating member of the second embodiment.

Referring to FIG. 2, according to a, second embodiment of the present invention, the extension portions 11 of the levers 1 are provided with straight edges, and the connecting rooms 22 have similar shape.

Figure 5:
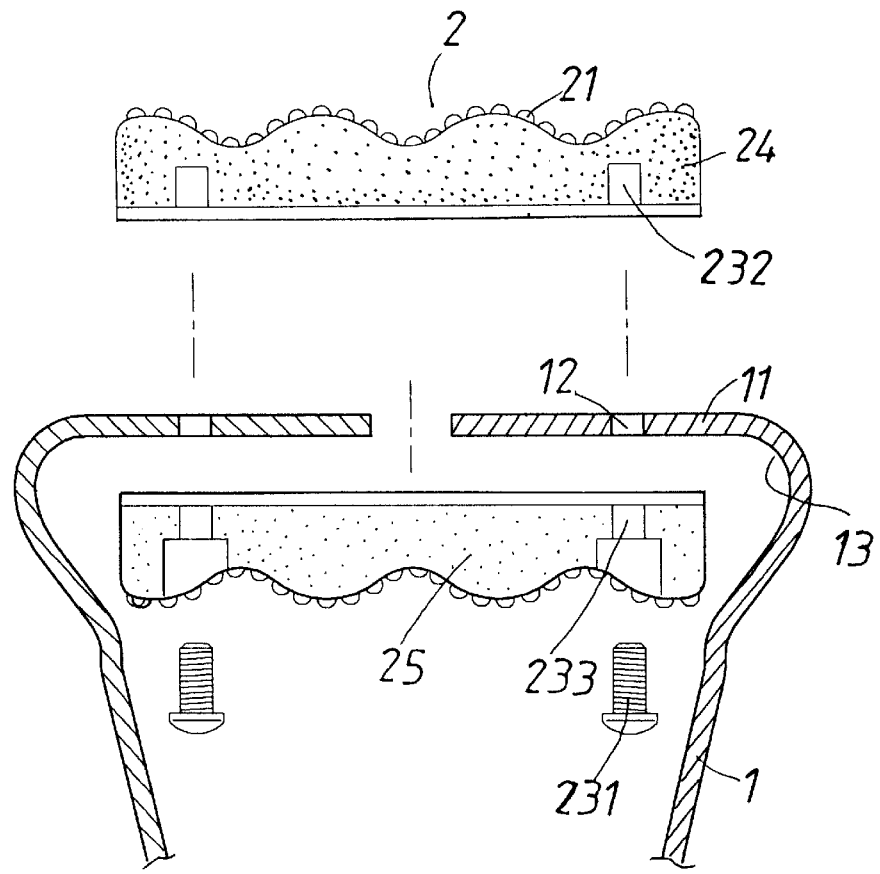
FIG. 5 is an exploded view of the operating member of the third embodiment.
Figure 6:
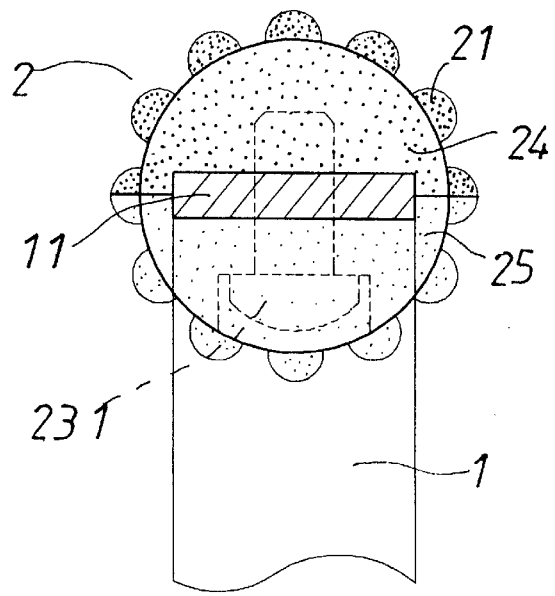
FIG. 6 is a cross-sectional view of the operating member of the third embodiment.

Referring to FIG. 5, a handle 2 including an upper and a lower parts 24, and 25 is provided. The upper, and the lower parts 24. and 25 also have corrugated surfaces, and can be provided with different colors. The upper part 24 is provided with threaded connecting holes 232, while the lower part 25 is provided with threaded connecting holes 233. The upper and lower parts 24, and 25 of the handle 2 are disposed on two sides of the extension portions 11 of the levers 1 with bolts 231 being screwed into the threaded connecting holes 232, 233, and the through holes 12 of the extension portions 11. Thus, the handle 2 is connected to the levers 1.

Figure 7:
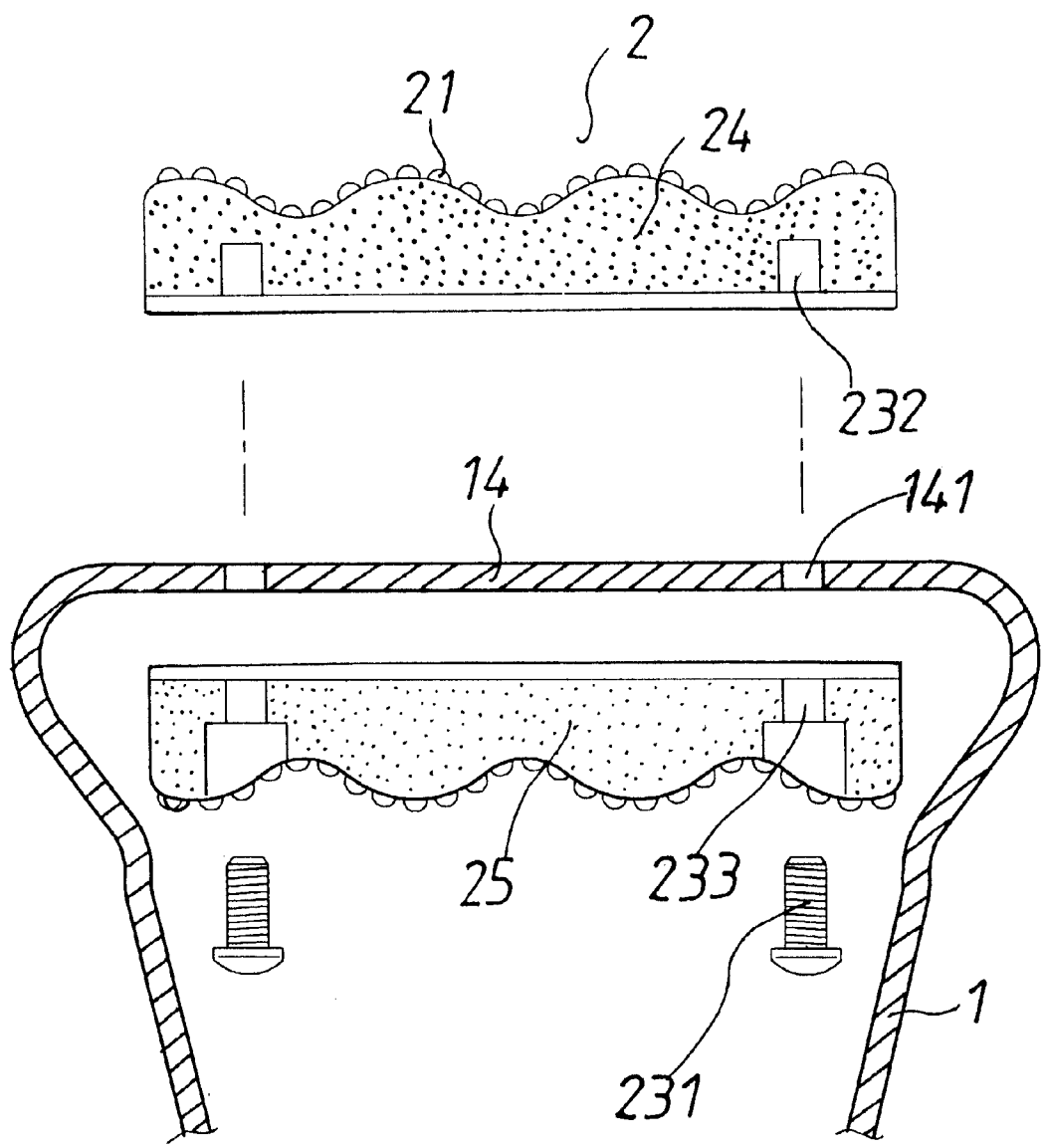
FIG. 7 is an exploded view of the operating member of the fourth embodiment.
Figure 10:
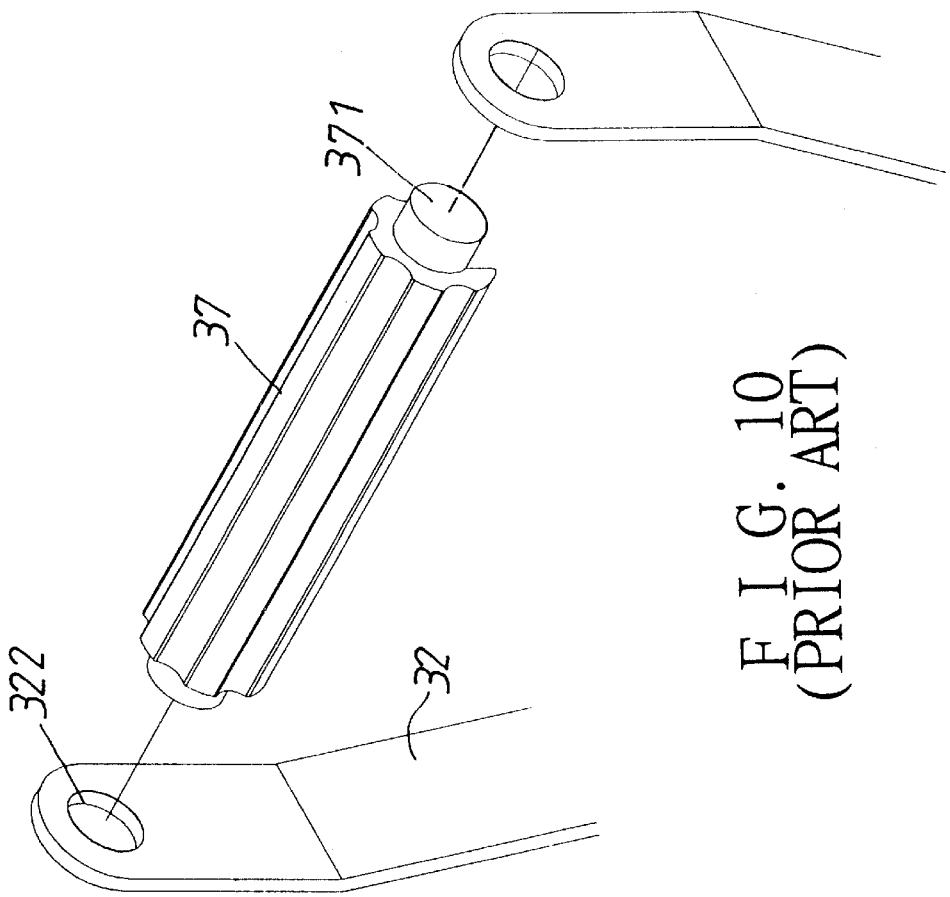
FIG. 10 is a perspective view of the handle and the levers of the conventional winch.

Referring to FIG. 7, the extension sections 11 of the levers 1, 1 are connected to each other at an inward end 14, and are disposed between the upper and the lower parts 24, 25 of the handle 2 with bolts 231 being screwed into holes 232, 141 and 141 to fasten the same to the handle 2.

From the above description, it can be easily understood that the present operating member of a lashing rope winch has advantages as followings:
1. The handle can be easily connected to the levers, therefore the cost of assembly is reduced.
2. The handle is presented with various shapes and colors to be attractive. And, when the handle is made of two separate parts, the parts can be formed with different colors for the handle to become still more attractive.
3. The anti-slip protrusions and corrugated surface allows the user to hold the handle firmly in operating the winch to stretch a rope.
4. The handle is luminous so that the workers can easily find the handle. in the dark, and people can become aware of the trick that is equipped with the winch when the truck is parked in the dark.

What is claimed is:

1. An operating member of a winch for lashing a rope, comprising,
    (a) a support base;
    (b) a turning rod with a first end and a second end having ratchets fixed at said first and second ends, capable of turning relative to said support base;
    (c) an engaging plate movably fitted to said support base for unlockably engaging said ratchets;
    (d) a handle, having connecting rooms or insertion cavities formed at two ends;
    (e) a pair of levers fixedly connected to the turning rod at first ends, and having bent extension portions at second ends, wherein said pair of levers each has a concavely curved section that is adjacent to said bent extension portion and faces said handle;
    (f) an engaging portion unlockably engaging the ratchets, wherein said handle is connected to the pair of levers with said connecting rooms or insertion cavities being fitted onto the bent extension portions for allowing the pair of levers to be operated for stretching a rope that is connected to said support base at one end, and to said turning rod at the other end.

2. The operating member of a winch according to claim 1, wherein the handle is formed with a corrugated surface.

3. The operating member of a winch according to claim 2, wherein the handle is formed with a plurality of anti-slip protrusions on a surface thereof.

4. The operating member of a winch according to claim 1, wherein the handle is made of materials having luminous substance added thereto in order to be luminous.

5. The operating member of a winch according to claim 1, wherein the handle is provided with luminous substance therein in order to be luminous.

6. The operating member of a winch according to claim 1, wherein the handle has connecting holes communicating with the connecting rooms, and the extension portions of the levers have through holes aligned with the connecting holes; bolts being screwed into the connecting holes for fastening the handle to the levers.

7. An operating member of a winch for lashing a rope, comprising,
    (a) a support based;
    (b) a turning rod with a first end and a second end having ratchets fixed at said first and second ends, and being capable of turning relative to the support base;
    (c) an engaging plate movably fitted to said support base for unlockably engaging the ratchets;
    (d) a handle including an upper and a lower part;
    (e) a pair of levers fixedly connected to the turning rod at first ends and having bent extension portions at second ends wherein said pair of levers each has a concavely curved section that is adjacent to said bent extension portion and faces said handle, said handle being connected to the levers with the upper and lower parts being fitted onto two sides of the bent extension portions;
    (f) an engaging portion unlockably engaging the ratchets; and,
    (g) bolts fastening same to the levers so that the levers can be operated for stretching a rope, said rope being connected to the support base at one end, and to the turning rod at other end.

8. The operating member of a winch according to claim 7, wherein the upper part, and the lower pat of the handle are different colors.

9. The operating member of a winch according to claim 7, wherein the extension portions of the levers are connected to each other, and are disposed between the upper and the lower parts of the handle with bolts fastening the same to the handle.

\* \* \* \* \*